Oct. 2, 1934.  C. J. HOLLAND  1,975,720
WEDGE MECHANISM FOR FRICTION SHOCK ABSORBING DEVICES
Filed Jan. 23, 1928  4 Sheets-Sheet 1
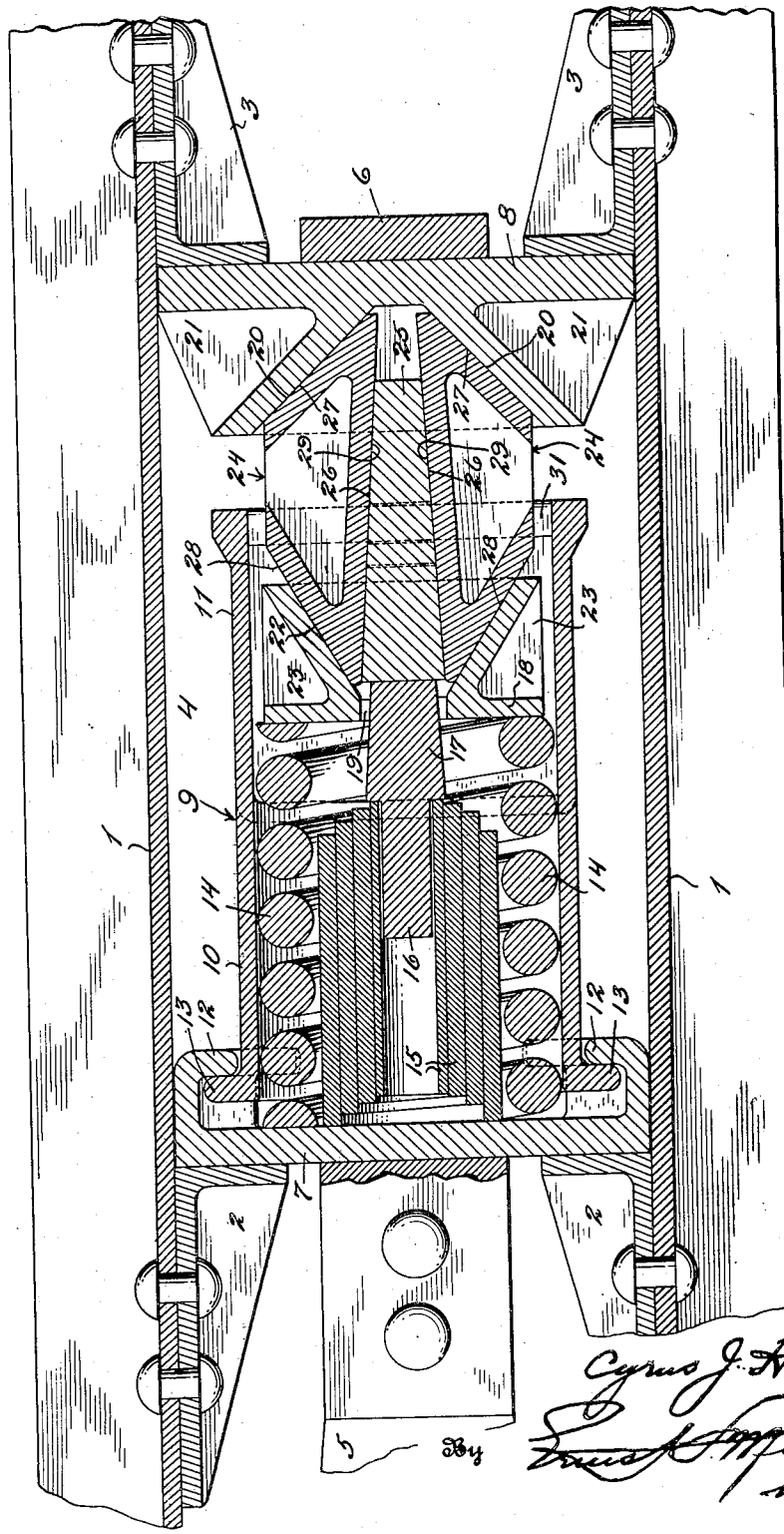

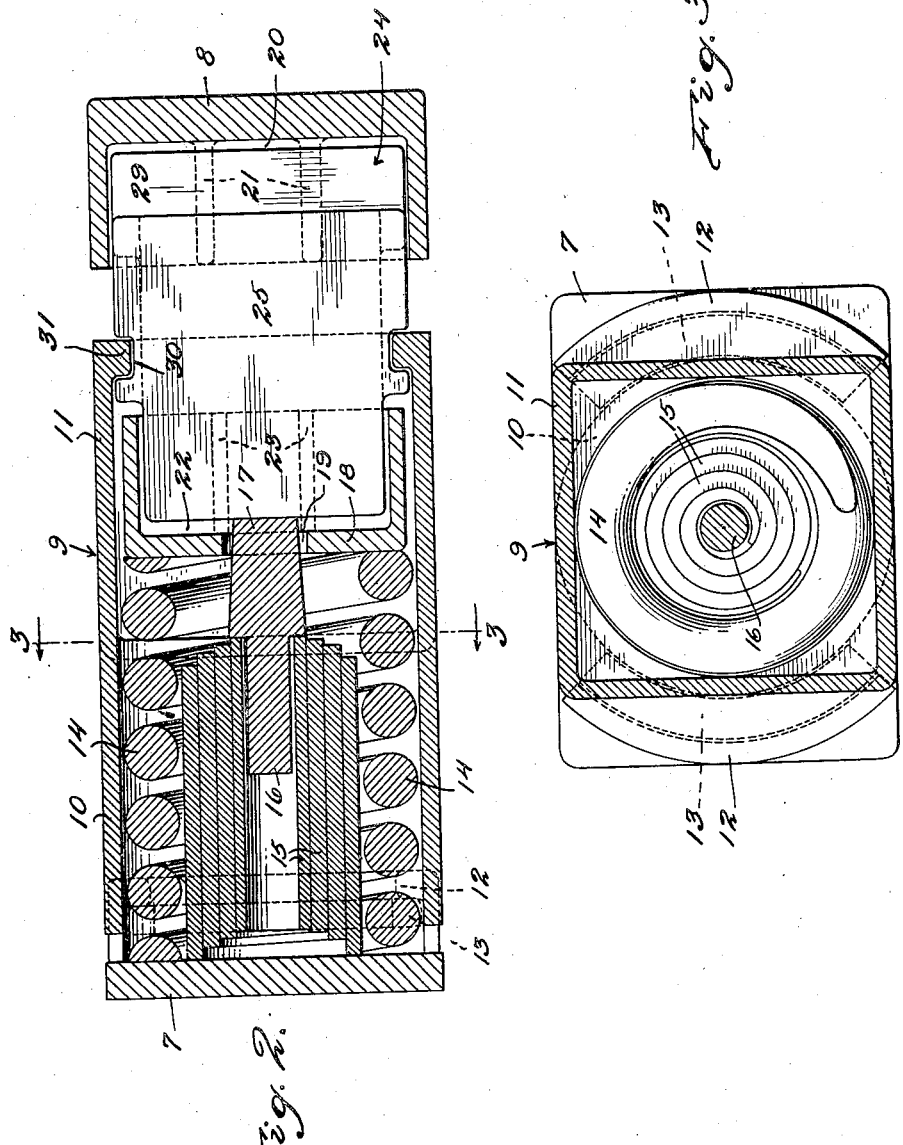

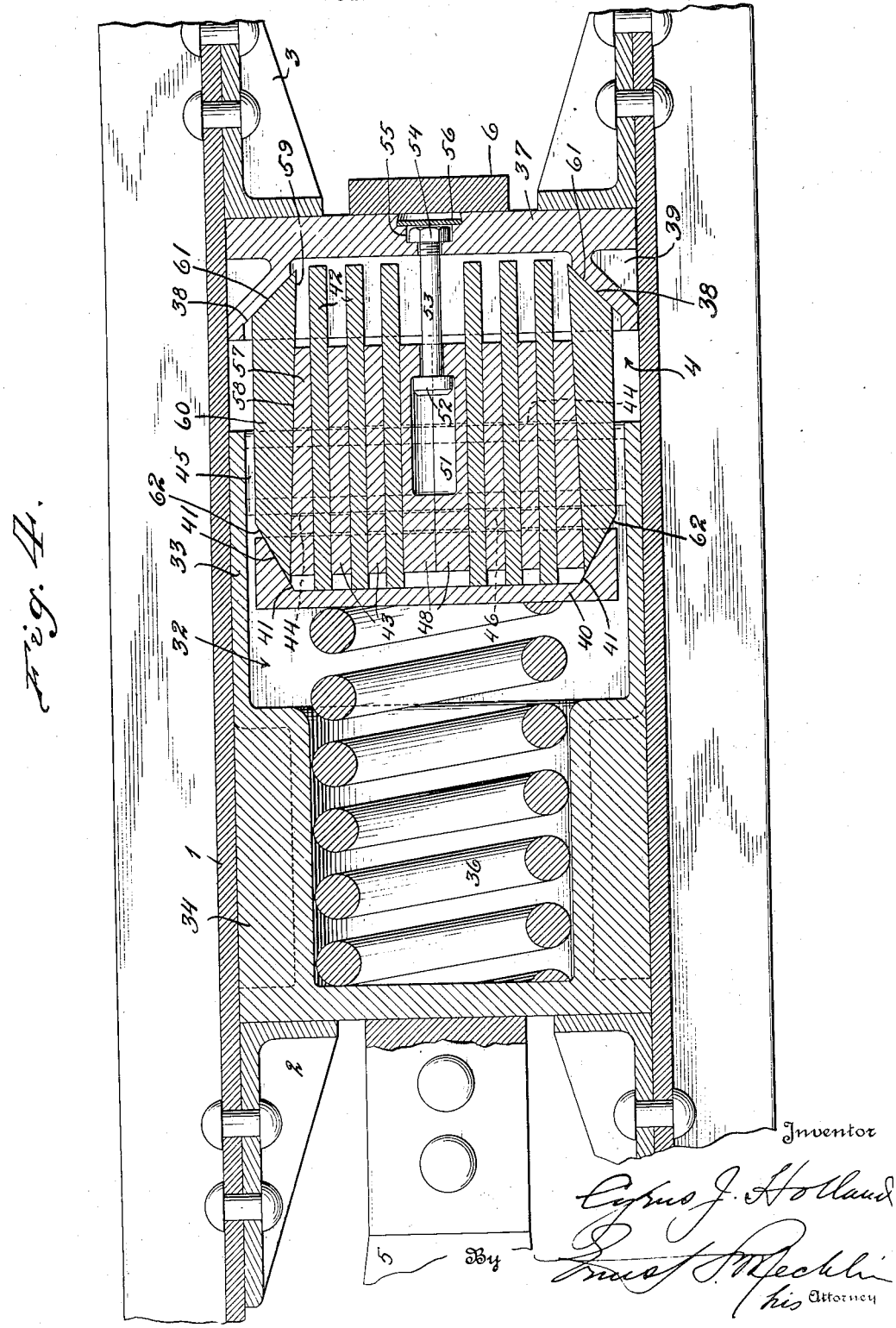

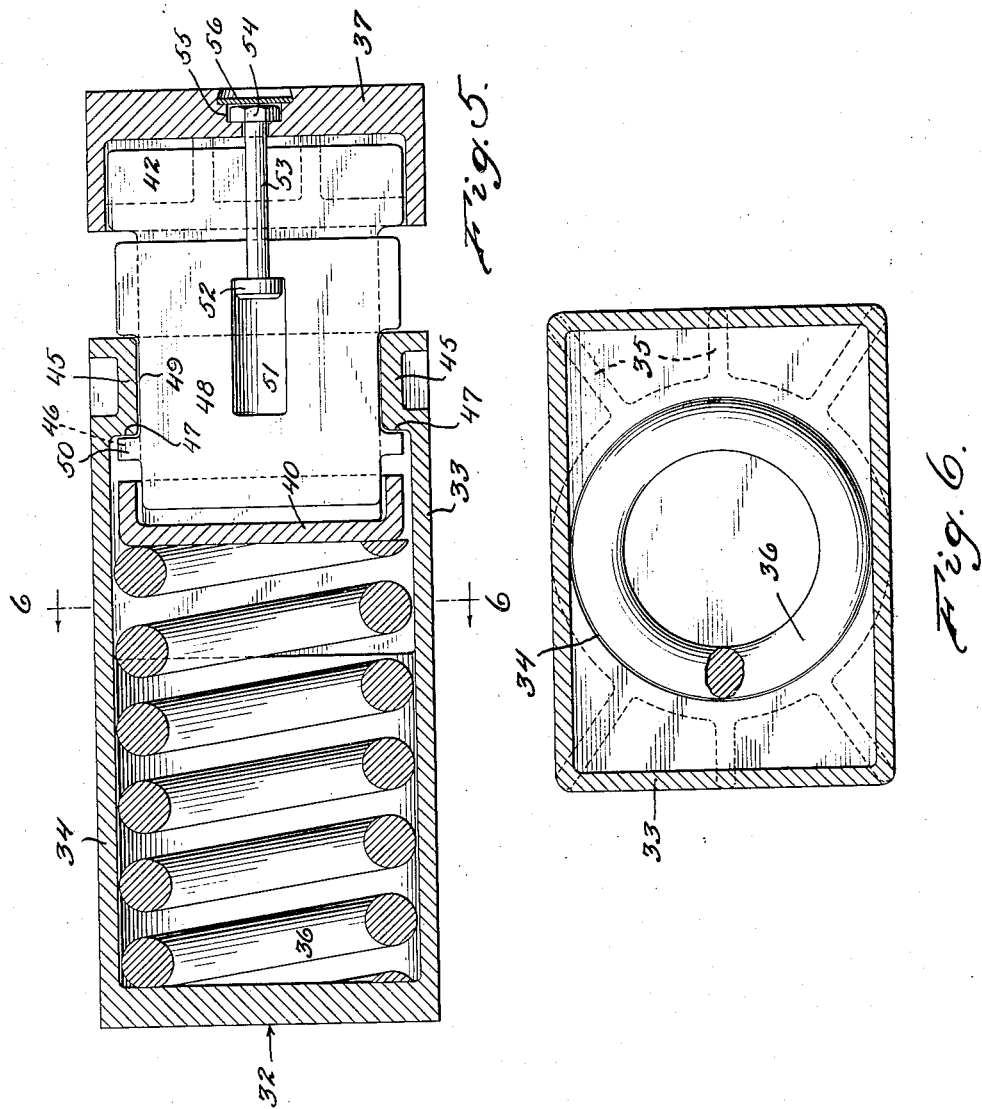

Patented Oct. 2, 1934

1,975,720

UNITED STATES PATENT OFFICE 1,975,720

WEDGE MECHANISM FOR FRICTION SHOCK ABSORBING DEVICES

Cyrus J. Holland, Chicago, Ill.

Application January 23, 1928, Serial No. 248,781

5 Claims. (Cl. 213—24)

The invention relates to shock absorbing mechanisms particularly adapted for use in connection with draft gears for railway cars and the like and has special reference in that connection to gears of the friction type in which there is provided a combination of spring means and friction producing means acting to absorb the blows and other shocks delivered during car travel.

All friction shock absorbing devices require and use wedge systems composed of a plurality of wedges through which the necessary pressures on the friction surfaces are obtained to produce or obtain increased capacity as well as to absorb or dissipate the energy.

The principal object of the invention, generally stated, is to provide a novel wedge system or arrangement of movable inclined planes, adapted to form a part of, or be embodied in, a shock absorbing device, the wedge system being equally applicable to and advantageous when employed in all designs of friction shock absorbing mechanism.

An important object of the invention is to provide a wedge system for a shock absorbing device that is capable of yielding under any pressure or shock irrespective of the amount of energy or speed of impact as against other wedge systems that actually wedge or stick under certain conditions, an important feature being the fact that my wedge system does not require or use a so-called release spring, whereas other wedge sustems capable of absorbing considerable shock require and use, in addition to the necessary wedge resistance spring, a separate spring against one of the wedge elements to facilitate release.

Another important object of the invention is to provide a wedge system or combination of movable inclined planes in which the amount of pressure due to the friction angle is added to the force applied for augmenting the pressure as distinguished from ordinary wedge systems in which the friction works against the force applied and causes a reduction in the pressure by the amount of the friction angle.

A further important object of the invention is to provide a wedge system for a shock absorbing device that will open up against the force applied and close up on release, it therefore being possible to use pressures up to the limit of the materials without danger of sticking on release. Because this wedge system opens up or expands against the force applied and closes up or contracts on release, the time of release will be less, which means that such a shock absorbing device will be ready for a second impact sooner. On release the members of this wedge system like other wedge systems are returned to their original positions and there will naturally be some rubbing of the various parts during this adjustment which will dampen or lessen the recoil, but as the time of release will be less the dampening effect may be somewhat less also.

Still another important object of the invention is to provide a wedge system for a shock absorbing device in which may be used a steeper angle on the force resisting wedge than on the force applying wedge, the reason for this being that the frictional resistance in the longitudinal direction adds to the force applying wedge to increase the lateral pressure at that end, but does not add to the force resisting wedge. The force resisting wedge therefore requires a greater leverage or a steeper wedge angle if the pressures are to be equalized at each end.

Still another object of the invention is to provide a wedge system for a shock absorbing device embodying a plurality of cooperating wedge members or elements having a large number of active faces of the most effective angles or pitch for obtaining the desired shock absorbing action.

Another object of the invention is to provide a wedge system for a shock absorbing device embodying a peculiar arrangement of wedge elements intermediate ones of which will be subjected to pressures from a plurality of directions and applied at different angles.

An additional object is to provide an arrangement of this character which will be simple and inexpensive to construct, assemble and install, positive in action, efficient and durable in service, and a general improvement in the art.

To the attainment of the foregoing and other objects and advantages, the invention preferably consists in the details of construction and the arrangement and combination of wedge parts to be hereinafter more fully described and claimed, and to make clear that this wedge system is adapted to and advantageous for use in a variety of shock absorbing devices, it is illustrated in two types of friction draft gears in the accompanying drawings in which:

Figure 1 is a horizontal sectional view taken through a spring-friction draft gear embodying a wedge system constructed in accordance with the invention, the said wedge system being also the friction elements, the gear being shown in mounted position within the gear pocket of a draft rigging, Figure 2 is a vertical longitudinal section taken centrally through the gear alone, Figure 3 is a vertical cross sectional view taken on substantially the line 3—3 of Figure 2, Figure 4 is a horizontal sectional view taken through an intercalated plate friction draft gear (one in which there is frictional resistance for the entire travel) embodying a wedge system constructed in accordance with the invention, the gear being shown in mounted position within the gear pocket of a draft rigging, Figure 5 is a vertical longitudinal section taken centrally through the gear alone, and Figure 6 is a vertical cross sectional view taken on substantially the line 6—6 of Figure 5.

These drawings illustrate two types of friction draft gears, one having a minimum number of friction elements and providing a preliminary plain spring action, and the other having a maximum number of friction elements without preliminary spring action. The idea behind the use of these illustrations is to show that this wedge system is equally applicable and advantageous irrespective of the number or arrangement of the friction elements and irrespective of whether or not preliminary spring action is included.

Referring more particularly to the drawings it will be observed that I have illustrated a portion of the draft rigging of a car, the numeral 1 designating the center sills and 2 and 3 representing the front and back stops which, with the center sills, define a gear pocket 4 within which is located my improved friction draft gear which cooperates with the coupler butt 5 and yoke 6.

In the embodiment of the invention illustrated in Figures 1 to 3, the gear includes front and rear followers 7 and 8 respectively, the former having detachably connected therewith and movable with respect thereto a housing 9 which may have its forward portion 10 cylindrical though its rear portion 11 is of rectangular shape to accommodate the wedge mechanism to be described. While it is true that there may be any preferred connection between the follower 7 and adjacent end of the housing 9, I have shown the former as provided with arcuate overhanging flanges 12 within which are engaged outstanding flanges 13 at the end of the housing, the arrangement being such that to effect assembly the housing must be positioned with its flanges 13 occupying the space between the flanges 12 so that upon relative rotation of the follower and housing the flanges may be brought into engagement as shown in Figures 1 and 3. By making the flanges 13 of less thickness than the space between the flanges 12 and the body of the follower 7 it is quite apparent that the housing 9 may move relatively to the follower to permit preliminary spring travel as will be hereinafter described. Located within the housing is a helical spring 14 within which is provided a second spring 15, the latter being preferably of volute form and having engaged therein the reduced shank 16 of a plunger 17.

The wedge means includes, in addition to the follower 8, an intermediate follower 18 which abuts against the helical spring 14 and which is provided with a central opening 19 for the passage of the plunger 17. The rear follower 8 is provided at its inner face with oppositely arranged inclined friction faces 20, it being preferable that webs 21 be provided for reinforcing purposes. The opposing face of the intermediate follower 18 is similarly provided with friction surfaces or faces 22 which extend in opposite directions and which are preferably reinforced by webs 23. The inclination of the faces 20 and 22 is disclosed as different as I have found this advantageous in practical use, though in some instances it is conceivable that such need not be the case.

Located between the follower 8 and intermediate follower 18 are intermediate wedge members indicated generally at 24, and located between these is a central expanding wedge 25 in abutting engagement with the plunger 17. The wedge 25 may be split and recessed for the accommodation of a bolt connecting with the follower 8. It is preferable that the opposite friction faces 26 of this central wedge member 25 have a relatively slight taper or pitch as compared with the friction faces 20 and 22. The wedge members 24 may conveniently be formed as castings and are preferably of webbed form as indicated for the sake of lightness though there is no limitation in this respect. These members 24 are represented as of trapezian shape and have inclined friction surfaces 27, 28 and 29 cooperating respectively with the friction faces 20, 22 and 26.

It is essential that the spreading wedge 25 be stationary relative to one housing section and while any suitable means accomplishing that result may be used, I have, in the present instance, shown this wedge member provided at its top and bottom with notches or recesses 30 receiving ribs 31 on the confronting inner faces of the housing 9.

In the normal position of the parts the followers 7 and 8 are in engagement with the stops 2 and 3 and the housing 9 has its flange 13 in engagement with the flange 12 on the follower 7. Upon the occurrence of pressure or a strain, shock or jar under either draft or buff, there will be relative movement between the follower 8 and follower 7, each pair of wedge members approaching each other slightly, or in other words, the wedge system contracts, thereby holding the friction system rigidly together without relative movement between the intermediate wedges 24 and center wedge 25 and acting simply to transmit the force to the center wedge 25, the entire wedge system moving as a unit and carrying with it the housing. During this movement the springs 14 and 15 will be compressed. The extent of this movement is determined by the distance between the flanges 13 and the follower 7 and this distance through which the parts may move as a unit provides for the preliminary spring travel which will take up all the minor shocks incident to train travel and thereby relieve the friction elements of a large amount of wear. The housing 9 is then solid with respect to the follower 7 and thereafter the center wedge 25 becomes stationary for the balance of the gear travel. As additional relative movement of the followers 7 and 8 then occurs the intermediate follower 18 and intermediate wedge members 24 are forced longitudinally toward the follower 7 against the resistance of the spring 14, the wedge members 24 reversing and riding up or outwardly upon the central wedge 25, or, in other words, the wedge system expands, this movement being opposed not only by the frictional contact of the faces 26 and 29 but also by the engagement of and pressure produced at the coacting surfaces 20 and 27 and 22 and 28.

It is preferable that the wedge surfaces 20 have a relatively blunt angle because the longitudinal frictional resistance between the relatively movable friction elements adds to the forward wedge pressure but does not add to the rear wedge pressure. As an illustration, let it be assumed that the friction angle is equal to 15°. The front wedge angle should be flatter by the amount of the friction angle than the rear wedge or, differently stated, the rear wedge should be steeper than the front wedge by the amount of the friction angle. In this particular instance the angle of the wedge members 20 is shown as 45° and the angle of the wedge members or faces 22 as 30°. There are, however, no limitations as to these figures.

In the form of the invention illustrated in Figures 4 to 6, inclusive, I have shown the same arrangement of center sills, front and back stops, yoke and coupler butt as above described, and also the same gear pocket. However, in this instance the gear is represented as one of the intercalated plate type without preliminary spring movement. In this form there is a housing 32 which normally engages against the front stops and which has its rear portion 33 of rectangular shape and its forward portion 34 of cylindrical form with outstanding reinforcing ribs or webs 35 for reinforcing purposes. A helical spring 36 is located within the cylindrical portion and projects into the rectangular rear portion in abutting engagement with the friction producing means or wedge system to be described.

In this case the wedge system includes a rear follower 37 having its forward face provided with divergent friction surfaces 38 located at the sides and preferably braced as by ribs or webs 39. Within the rectangular rear portion 33 of the housing is a follower 40 abuttingly engaged by the spring 36 and provided at opposite sides with diverging friction surfaces 41 which are preferably of more acuate angularity than the friction surfaces 38 on the follower 37. Interposed between the followers 37 and 40 are the intercalated friction plates 42 and 43, the former of which are intended to be moved by the followers and the latter of which are notched or recessed at their edges, as shown at 44, for fitting engagement upon inwardly extending projections 45 at the top and bottom of the rear rectangular portion 33 of the housing. The plates 43 are also represented as having projecting portions 46 engaging against the forward edges 47 of the top and bottom ribs 45 of the housing 33. Located between the innermost pair of plates 42 is a plate or block 48 notched at 49 in identically the same manner as the plates 43 are notched, and similarly formed with projections 50 engaging the forward edge 47 of ribs 45. This central block or plate member is shown as split or formed in sections with the confronting faces thereof recessed at 51 for the accommodation of the head 52 of a bolt 53 which carries a nut 54 located within a recess 55 in the follower 37, the recess being preferably closed by a plate 56 held in place as for instance by peening over the edges of the recess. This bolt 53 of course holds the follower 37 in assembled relation to the remainder of the parts but as the recess 51 is of considerable length there will be no interference with the necessary movement of the follower 37 with respect to the block or plate 48. It is obvious that the gear, Figures 1 to 3, inclusive, can be similarly arranged by splitting and recessing the center wedge 25.

The wedge means further includes spreading wedge members 57 located against the outer sides of the outermost plates 42, these wedge members having inclined outer sides 58 coacting with the inclined inner sides 59 of trapezian shaped intermediate wedges 60 which extend between the followers 37 and 40 and which have beveled or inclined ends 61 and 62 of differing angles cooperating with and conformingly engaging the surfaces 38 and 41, respectively.

The wedge system in this form, Figures 4 to 6, inclusive, is identical in principle with that shown in Figures 1 to 3, inclusive. In each case there are two opposed followers with diverging wedge faces, two opposed trapezian shaped intermediate wedges and between them a spreading wedge. In the intercalated plate form of gear, Figures 4 to 6, inclusive, the spreading wedge is shown split, one half against each trapezian shaped wedge instead of being centrally located, as this arrangement will necessitate less transverse movement of the plate friction members. There is, however, no limitation in this respect as it may, in some instances, be desirable to locate the spreading wedge centrally.

In the operation of this form of the invention it will be apparent that the same general action occurs as in the first form with the exception, of course, that there is no preliminary spring action. Upon closing of the gear the two opposed wedge followers approach each other slightly causing the two trapezian shaped wedge members to approach each other, or, in other words, the wedge system contracts, thereby increasing the pressure on the friction elements and on continued movement the spreading wedge goes into action, causing the other wedges to reverse themselves and expand. The force applying wedge follower 8, Figures 1 to 3, inclusive, and 37, Figures 4 to 6, inclusive, of course, remains stationary on a buff and travels forward on a pull. The force resisting wedge or intermediate follower 18, Figures 1 to 3, inclusive, and 40, Figures 4 to 6, inclusive, is, therefore, forced to increase the movement to compensate for the inability of the force applying wedge to actually go backward.

From the foregoing description and a study of the drawings it will be apparent that I have thus provided a wedge system in which the amount of pressure due to the wedge angle is added to the force applied, thereby augmenting the lateral pressure because the two side wedges or intermediate wedges are forced to reverse themselves and back up against the force applied. Actually, pressures may be employed up to the limit of the materials without any danger of sticking on release because the wedge system opens up against the force applied and closes on release. The particular arrangement disclosed has the additional advantage of increasing the leverage applied to the moving parts.

While I have shown and described preferred embodiments of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. In a shock absorbing device, a housing formed of relatively movable sections, a spring pressed central friction element stationary with respect to one section thereof, a force applying wedge, a separately spring pressed force resisting wedge spaced from the force applying wedge, and friction shoes located at opposite sides of and engaging said friction element and formed as wedges engaging said force applying and force resisting wedges and moved toward each other when the latter are moved relatively toward each other, the wedging angle of the force resisting wedge with respect to the longitudinal axis of the device being keener than the wedging angle of the force applying wedge considered with respect to the longitudinal axis of the device.

2. In a shock absorbing mechanism, a friction producing assembly comprising a housing formed of relatively movable sections, a friction element stationary with respect to one section thereof and having inclined sides, a force applying wedge movable with respect to the housing, a force resisting wedge spaced from the force applying wedge, spring means engaging said force resisting wedge and one end of the housing, preliminary spring means separate from said first named spring means engaging said end of the housing for opposing movement of said friction element, and members located at opposite sides of said friction element in engagement with the inclined faces thereof and located entirely between said wedges and engaging thereagainst, the contacting surfaces of the force resisting wedge and said members forming a keener angle with the longitudinal axis of the housing than the contacting surfaces of the force applying wedge and said members.

3. In a shock absorbing device, a friction producing assembly comprising a housing including relatively movable sections, a force applying wedge independent of and spaced from the housing, a force resisting wedge within the housing, spring means engaging and opposing movement of the force resisting wedge in one direction a pair of longitudinal friction shoes and an interposed friction element bridging the space between the force applying wedge and the housing, separate spring means engaging and opposing movement of said interposed friction element in one direction said longitudinal friction shoes having inclined surfaces contacting with the force applying and force resisting wedges, respectively, the angle between the inclined surfaces at the force resisting wedge and the side of said interposed element being more acute than the angle between the inclined surfaces at the force applying wedge and the side of the interposed element, said interposed element being stationary with respect to one section of the housing.

4. In a shock absorbing device, a friction producing assembly comprising a housing including relatively movable sections, a force applying wedge spaced therefrom, a force resisting wedge within the housing, a pair of longitudinal friction shoes and an interposed friction element slidably engaged thereby, said shoes having inclined surfaces contacting with the force applying and force resisting wedges, respectively, the angle between the inclined surfaces at the force resisting wedge and the side of said interposed element being more acute than the angle between the inclined surfaces at the force applying wedge and the side of the interposed element, said interposed element being stationary with respect to one section of the housing and having converging sides, and separate spring means reacting against one housing section and against said force resisting wedge and against said interposed friction element, respectively.

5. In a shock absorbing mechanism, the combination of a housing formed of relatively movable sections, a central friction element stationary with respect to one section, volute spring means reacting against said central friction element and the other section, a force applying wedge, a force resisting wedge spaced from the force applying wedge, helical spring means reacting against the force resisting wedge and the second named housing section, and a pair of friction shoes engaging opposite sides of said friction element and having inclined ends constituting wedges engaging the force applying and force resisting wedges, respectively, whereby the shoes will be forced inwardly when the force applying and force resisting wedges are moved relatively toward each other, the angle formed by the inclined surfaces of said friction shoes at the force resisting wedge end with respect to said central friction element being more acute than the angle formed by the inclined surfaces at the force applying wedge end with respect to the central friction element.

CYRUS J. HOLLAND.